T. N. RUSSELL.
CAR ROOF.
APPLICATION FILED FEB. 24, 1913.
1,173,220.
Patented Feb. 29, 1916.
4 SHEETS—SHEET 3.
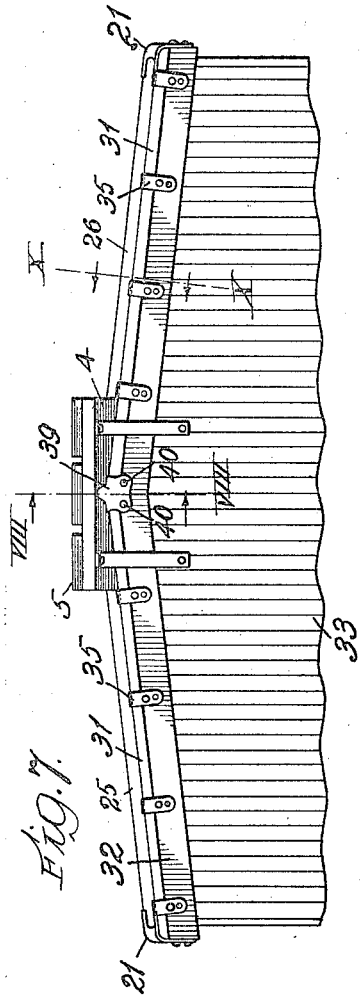
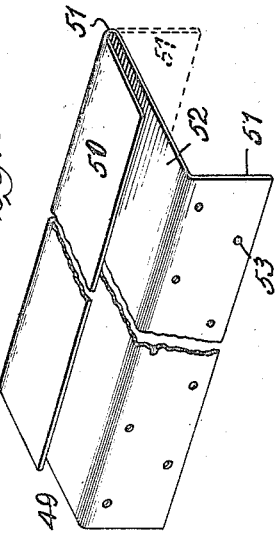
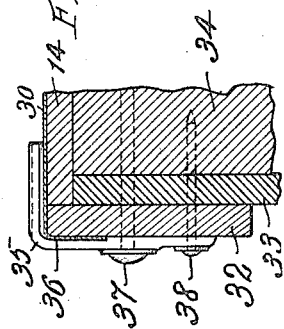
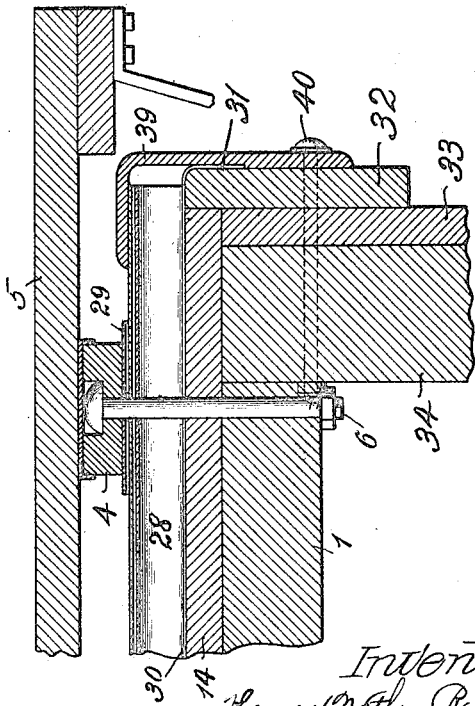

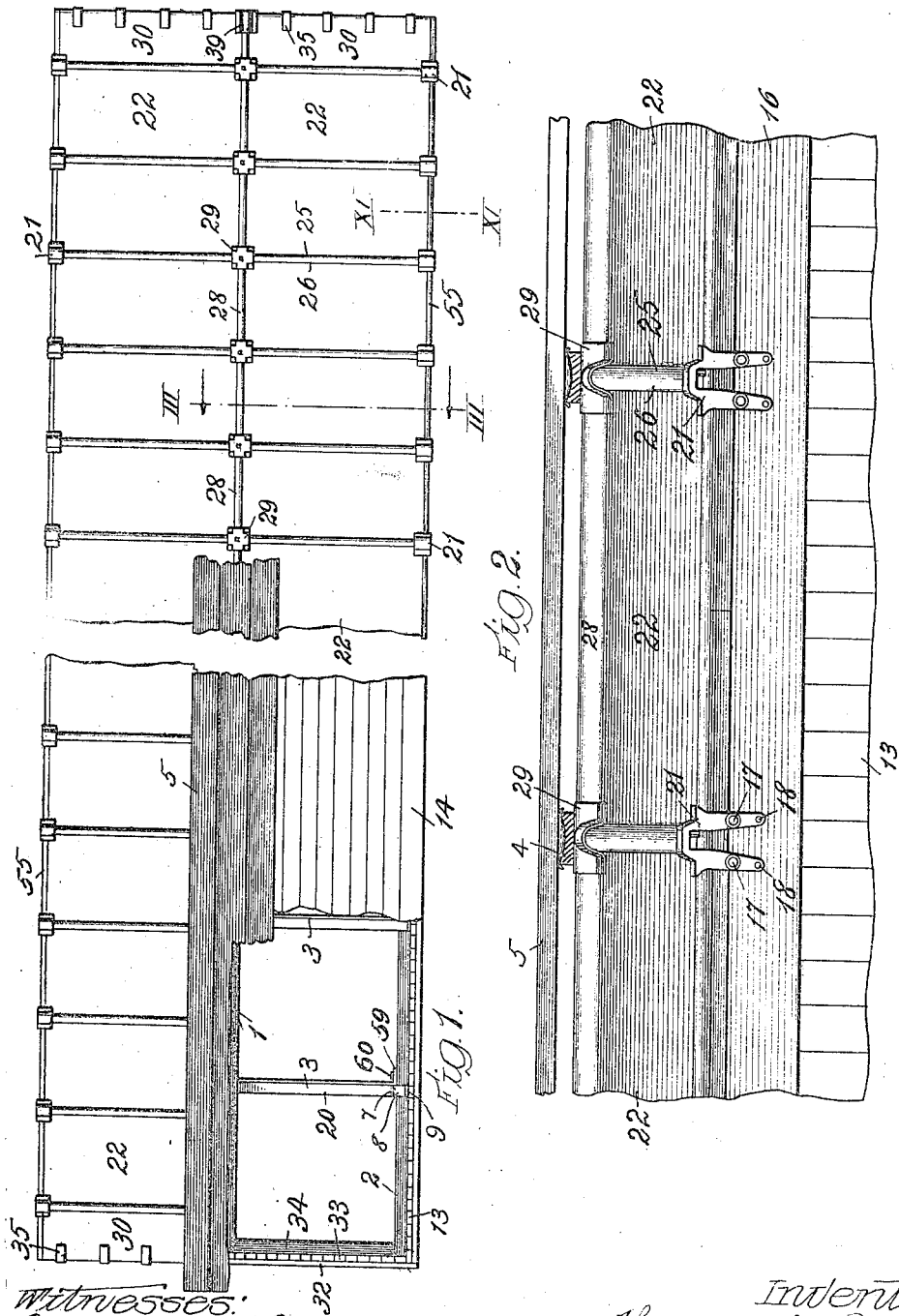

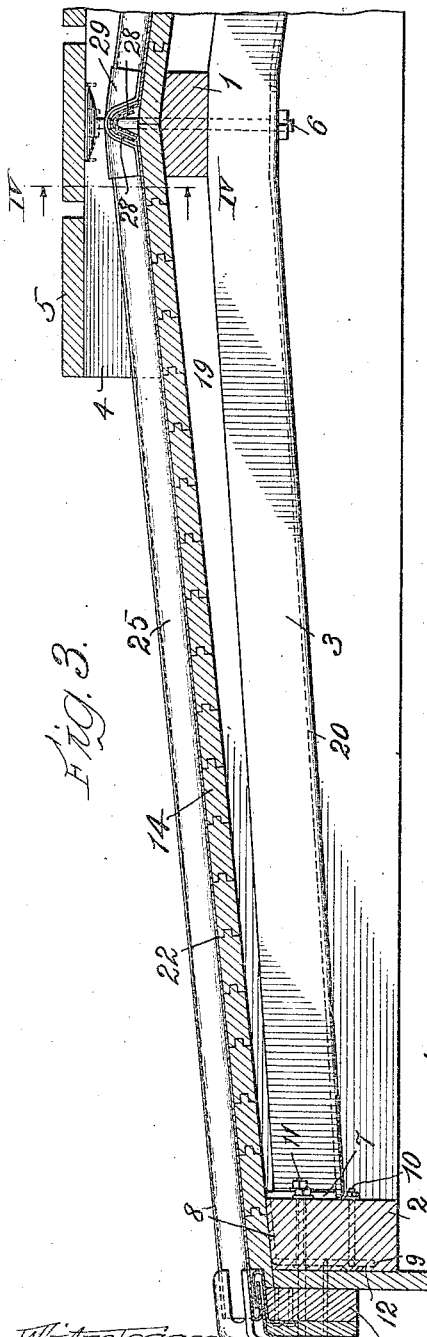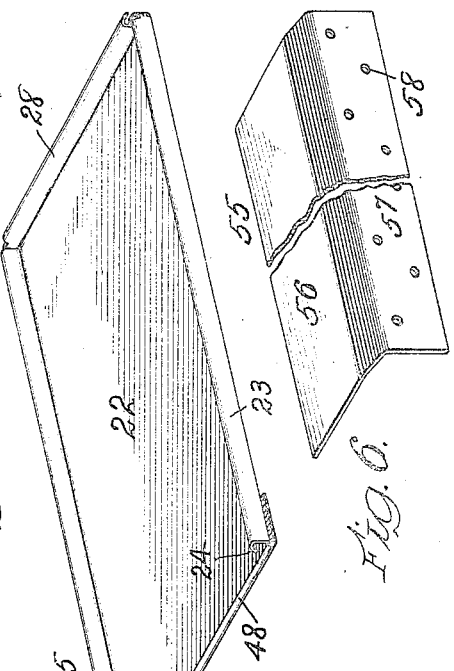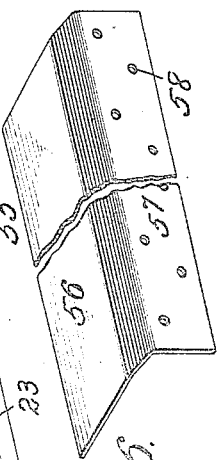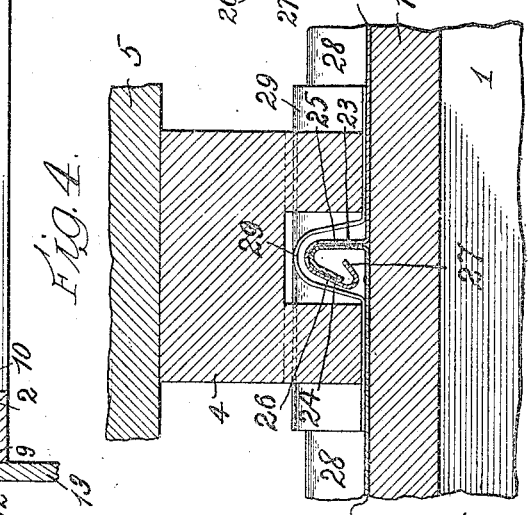

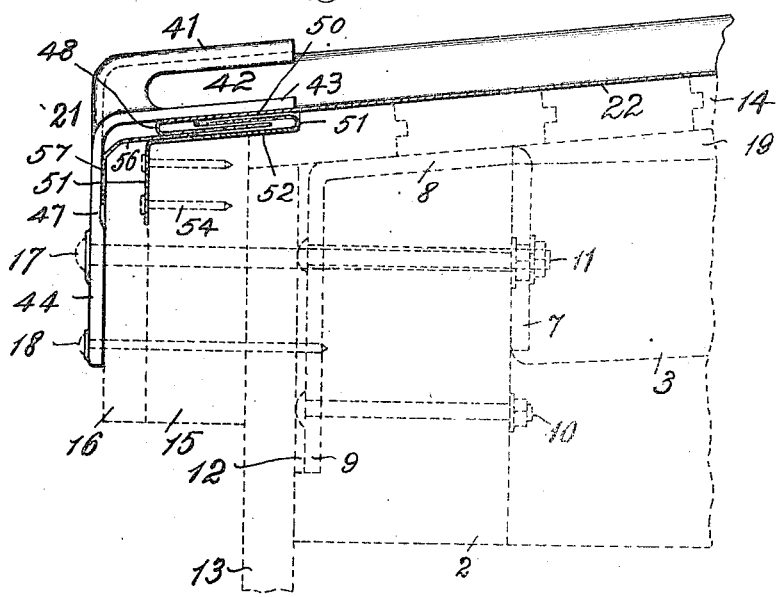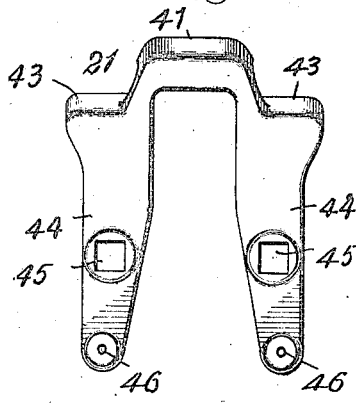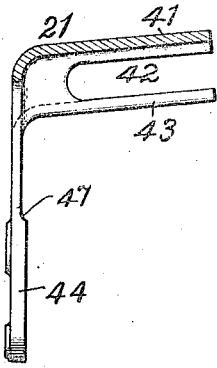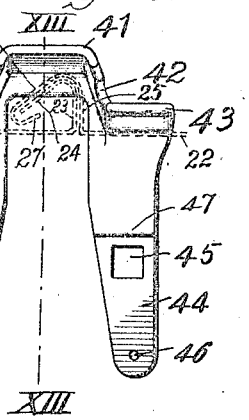

UNITED STATES PATENT OFFICE.

THOMAS NATHAN RUSSELL, OF CHICAGO, ILLINOIS, ASSIGNOR TO CHICAGO-CLEVELAND CAR ROOFING COMPANY, A CORPORATION OF ILLINOIS.

CAR-ROOF.

1,173,220.   Specification of Letters Patent.   Patented Feb. 29, 1916.

Application filed February 24, 1913. Serial No. 750,072.

*To all whom it may concern:*

Be it known that I, THOMAS NATHAN RUSSELL, a citizen of the United States, residing in Chicago, in the county of Cook and State of Illinois, have invented a new and useful Improvement in Car-Roofs, of which the following is a specification.

The invention relates to outside metal car roofs, and more particularly, and principally, to the means for securing the roof sheets at the eaves and for protecting the eaves of the roof; and consists in the parts and combinations thereof hereinafter set forth and claimed.

In order to make the invention more clearly understood, there are shown in the accompanying drawings means for carrying the same into practical effect, without limiting the improvements, in their useful applications, to the particular construction which, for the purpose of example, has been delineated.

In said drawings:—Figure 1 is a plan view, partly broken away, of an outside metal freight car roof embodying the invention. Fig. 2 is a side view of a portion of the same, on a larger scale. Fig. 3 is a transverse vertical section of the same, on line III—III of Fig. 1. Fig. 4 is a longitudinal vertical section, on a larger scale, on line IV—IV of Fig. 3. Fig. 5 is a perspective view of one of the metal roof sheets. Fig. 6 is a perspective view, partly broken away, of the eaves flashing. Fig. 7 is an end view of a portion of a freight car, showing the said roof. Fig. 8 is a vertical longitudinal section, on line VIII—VIII of Fig. 7, the same being on a larger scale. Fig. 9 is a perspective view, partly broken away, of the eaves strip. Fig. 10 is a vertical longitudinal section, on line X—X of Fig. 7. Fig. 11 is a transverse section, on a larger scale, on line XI—XI of Fig. 1, showing in dotted lines parts of the roof frame, top and side sheathing, and side fascia, including a side view of the seam clip. Figs. 12, 13 and 14 are respectively an outer face view, a central vertical section on line XIII—XIII of Fig. 14, and an inner face view, of the said seam clip for inclosing and securing the outer ends of the roof seams.

Referring to the drawings, 1 is the ridge pole supported from the side plates 2 by carlines 3. The latter may be of any suitable construction and are shown of angle iron form, united with the ridge pole and saddles 4 of the running board 5 by vertical through bolts 6. The outer ends of the carlines are formed with vertical flanges 7 which lie against the inner faces of the side plates, and with horizontal flanges 8 (see dotted lines in Fig. 11) which rest on the tops of the side plates, and with outer vertical flanges 9 which engage the outer faces of the side plates. These latter flanges are tied to the side plates by bolts 10 which pass through the lower ends of the flanges 9 and the side plates. Bolts 11 above the bolts 10, pass through the flanges 9, the side plates and the flanges 7. The flanges 9 are fitted in recesses 12 formed in the outer faces of the side plates, and are covered by the side sheathing 13 which may be applied in the usual manner. The top sheathing 14, is formed of matched boards, running either longitudinally as shown, or transversely of the car, and resting on rafters 19. These rafters may rest on the bottom flange 20 of the carlines. The upper part of the side sheathing 13 is overlaid by an inner fascia 15 and an outer fascia 16, both of which are united with the side plates by through bolts 17 and nails 18. These bolts and nails may also secure in place the seam clips 21.

The roof sheets 22 (Fig. 5), of galvanized iron or other suitable material, are each formed (excepting the end sheets) at one side with a vertical flange 23 terminating in a flange 24 extending on an incline downwardly and inwardly over the main body of the sheet, (see also Fig. 4). On the other side the sheet is formed with a vertical flange 25, the top of which is bent over outward and downward to form the outwardly inclined flange 26; and the lower edge of the flange 26 is turned inward and upward to form the inwardly inclined flange 27. Such roof sheets are fitted together, the flanges 25, 26, 27 of one sheet interlocking with the flanges 23, 24 of the next sheet, as seen in Fig. 4. In so interlocking the sheets they may be slid endwise, from the eaves toward the ridge of the roof. The inner end of each sheet is formed with the inverted U-flange 28, and by means of these flanges the sheets on opposite sides of the ridge are interlocked in a known manner (Fig. 3). Along the ridge, at the points where four sheets thus meet, are arranged intersection caps 29 each formed to embrace the two meeting ridge seams and the two meeting side seams. The bolts 6 pass through the centers of the intersection caps 29 and down past the ends of the roof sheet flanges. The flanges 25, 26, 27 are so formed as above described as to take the place of and render unnecessary the usual seam cap.

The end sheets 30 are or may be of less width than the intermediate roof sheets 22 (Fig. 1), and are provided along one transverse edge with a depending flange 31 (Figs. 7, 8, and 10). At one end of the car the flange 31 takes the place of the flanges 23 and 24 of the intermediate sheets 22, and at the other end of the car the flange 31 takes the place of the flanges 25, 26 and 27 of such intermediate sheets. The depending flanges 31 overlie the end fascia 32, which latter confines the upper part of the end sheathing 33 against the end sills 34. At the ends of the car the end sheets are held against the end fascia and down upon the top sheathing by end clips 35 which are recessed on their inner faces as indicated at 36 to receive the sheets and flanges 30 and 31 (Fig. 10). The lower parts of the end clips are secured to the end plates by through bolts 37 and by nails 38. In line with the ridge pole is located an end seam clip 39 the upper part of which fits over and secures the seam formed on the ridge by the sheet flanges 28, interlocked as already described; and the lower part of which is secured to the end plate by through bolts 40.

The seam formed between the roof sheets by the flanges 23, 24, 25, 26, and 27 are confined at their eaves ends by the seam clips 21. The seam holding part of this clip (Figs. 11 to 14) is in a general way semi-tubular, and of skeleton form to permit the escape of water, cinders and dust which would otherwise accummulate under it and corrode and destroy the roof sheets. It comprises an upper socket part 41 which overlies the sheet seam and is of sufficient width interiorly to allow the seam considerable lateral play, without bearing upon either the seam or the flat parts of the sheets to more than a minimum extent. At the sides of the part 41 are formed openings 42, leaving below the openings tongues 43 which extend just above the flat parts of the sheets and near the sides of the seams. These parts, 43 and 41, hold the roof sheets down on the top sheathing and confine the seams with limited lateral play.

Extending down from the seam containing part of the clip 21 is the supporting and securing part of the same, which is widely extended longitudinally of the car. It consists preferably of separated legs 44 leaving between them a hole or space through which cinders, dust and water that follow down along the seam may freely escape. These legs may or may not be united below the said space, the latter form being shown. They are formed with widely separated holes 45 for the bolts 17, and with holes 46 for the nails 18, thus giving a wide base of securement lengthwise of the car. At 47 the legs are formed on the underside with shallow recesses to receive the eaves flashing. The seam clip is preferably a one-piece malleable iron casting.

It will be understood that the improved sheet seams and seam clips above described may be employed in a car roof in which the sheets and seams extend to the outer side of the fascia and the sheets are bent down to inclose the fascia, but I prefer to construct the eaves part of the roof according to the improvements hereinafter described.

The outer edges of the roof sheets are rebent to form under turned U-shaped bends and inwardly extending hook flanges 48 which may or may not extend over or partially over the fascia, which is below them. The former arrangement is illustrated. The metal eaves strips consisting of a hook stripping that is to coöperate with the roof sheets 22 to weather-proof the joints between the roof and the sides of the car, and to anchor the roof sheets and also allow of slippage between the eaves strips and the roof sheets, are shown at 49, one of them being shown detached and in perspective in Fig. 9. Such strip is angular in formation, having a wall or side 50 interposed between the sides of the U-shaped bend 48 of the roof sheets, and a vertical wall or side 51. A portion of the latter is employed to secure the eaves strip to the car and is suitably situated for that purpose. It may be arranged between a fascia and the sheathing of the car, or between two fascias as illustrated. Also the vertical wall 51 may be formed all in one plane, or in two planes as illustrated in Figs. 9 and 11, the two parts being connected by a substantially horizontal wall 52. This detail of construction depends upon the point at which the lower part of the strip 49 is attached to the car and upon how far within the eaves edge of the car structure the bend 48 is situated. When the wall 51 is formed all in one vertical plane it depends directly from the inner edge of the substantially horizontal wall or side 50, as seen in dotted lines in Fig. 9. 53 shows nail holes in the wall 51 to receive nails 54 by which the eaves strip may be secured in place. Clearance spaces intervene between the edge of the free or bottom side of the U-shaped bend 48 and the vertical wall 51 and between the curve of the bend 48 and the opposed edge of the interposed eaves strip wall 50, as shown in Fig. 11. These clearances permit of relative motion or slippage between the roof sheets and the eaves strip. These strips are continuously coextensive with the sides of the car to secure the weather-proofing action. They may be formed in sections but in effect they are unbroken in length.

With the eaves strip I combine with it an eaves flashing 55, shown detached in Fig. 6. This flashing is formed with a top flange 56 which enters sufficiently for weather-proofing purposes between the bends 48 and the eaves strip, and with a lower flange 57 which incloses the outer fascia and may be secured to the latter by suitable nails driven through the holes 58 formed in the flange 57.

The combination and interlocking of the roof sheets and the eaves strip as illustrated involve the subject of the patent to Mathews No. 782,979, dated Feb. 21, 1905; and with such roof sheets and eaves strip I have combined the described features of improvement.

By the described construction, of an eaves flashing combined with but independent of the roof sheets and eaves strip, I secure the efficient water proofing of the entire eaves edge of the car, including the fascia, and at the same time insure the integrity of the roof sheets in many side-wiping accidents in which the flashing is rumpled up or torn off, leaving however the roof sheets still held down by the eaves strip and the latter still protecting from rain (until repairs can be made) the joint between the roof and the side sheathing.

What I claim is:

In an outside metal car-roof, in combination: a roof-sheet having its eaves-end rebent within the outer eaves-line of the roof; hook-stripping engaging such rebent sheet-end and having a depending member secured within such eaves-line, and adapted to have a fascia applied outside of said depending member and secured to the underlying structure; and a flashing for inclosing the upper part of the fascia and freely entered between said rebent sheet-end and the said depending member and extending inward and protecting the joint between such fascia and said depending member of the hook-stripping.

In testimony whereof, I have hereunto set my hand in the presence of two subscribing witnesses.

THOMAS NATHAN RUSSELL.

Witnesses:
   HENRY LOVE CLARKE,
   PEARL ABRAMS.